United States Patent [19]  [11] 4,222,912
Sekmakas et al.  [45] Sep. 16, 1980

[54] LOW TEMPERATURE CURING EPOXY ESTER COPOLYMERS

[75] Inventors: Kazys Sekmakas, Palatine; Raj Shah, Schaumburg, both of Ill.

[73] Assignee: DeSoto, Inc., Des Plaines, Ill.

[21] Appl. No.: 960,309

[22] Filed: Nov. 13, 1978

Related U.S. Application Data

[63] Continuation-in-part of Ser. No. 715,382, Aug. 18, 1976, abandoned, and Ser. No. 749,968, Dec. 13, 1976, abandoned, and Ser. No. 844,021, Oct. 21, 1977, Pat. No. 4,151,131.

[51] Int. Cl.$^2$ .......................... C09D 3/52; C09D 3/56; C09D 3/58
[52] U.S. Cl. ........................ 260/23 EP; 260/19 EP; 260/19 UA; 260/21; 260/23 CP; 260/29.6 NR; 260/29.6 RW
[58] Field of Search ............... 260/19 EP, 19 UA, 21, 260/23 EP, 23 CP, 29.6 NR, 29.6 RW

[56] References Cited

U.S. PATENT DOCUMENTS

| | | | |
|---|---|---|---|
| 3,960,983 | 6/1976 | Blank | 260/29.3 |
| 4,116,901 | 9/1978 | Sekmakas et al. | 260/19 EP |
| 4,145,323 | 3/1979 | Sekmakas et al. | 260/23 EP |
| 4,151,131 | 4/1979 | Sekmakas et al. | 260/19 EP |

*Primary Examiner*—Ronald W. Griffin
*Attorney, Agent, or Firm*—Dressler, Goldsmith, Shore, Sutker & Milnamow, Ltd.

[57] ABSTRACT

Low temperature curing aqueous coatings are provided by combining a water soluble bisphenol polyol with a branched copolymer of an unsaturated epoxy ester with monoethylenic monomers including about 3% to about 20% carboxyl-functional monomer, based on the weight of the copolymer, so that the copolymer can be dispersed in water with the aid of a volatile base. The solids content is increased or the viscosity is lowered, the curing temperature is reduced, and the corrosion resistance is enhanced by the presence of the bisphenol polyol.

6 Claims, No Drawings

LOW TEMPERATURE CURING EPOXY ESTER COPOLYMERS

This application is a continuation-in-part of our prior applications Ser. No. 715,382, filed Aug. 18, 1976, now abandoned, and Ser. No. 749,968 filed Dec. 13, 1976, now abandoned, and also of our application Ser. No. 844,021 filed Oct. 21, 1977, now U.S. Pat. No. 4,151,131 issued Apr. 24, 1979.

DESCRIPTION

TECHNICAL FIELD

The present invention relates to low temperature-curing aqueous coating compositions and presents an improvement over the disclosure of our prior copending application Ser. No. 844,021 filed Oct. 21, 1977.

DISCLOSURE OF INVENTION

In accordance with this invention, an aqueous coating composition contains a branched copolymer of an ethylenically unsaturated epoxy ester with monoethylenic monomers including about 3% to about 20% of carboxyl-functional monomer, based on the weight of the copolymer, the copolymer being dispersed in the aqueous composition with the aid of a volatile base, an aminoplast or phenoplast resin curing agent, and a water soluble bisphenol polyol is employed to increase the solids content or reduce the viscosity. It also functions to lower the curing temperature and enhance the corrosion resistance.

Branching takes place because the ethylenically unsaturated epoxy ester is itself resinous, and also because it normally contains a plurality of unsaturated polymerization sites, so the monomers form branches which grow away from the resinous epoxy ester core. The resulting branched copolymer is more easily cured (converted to an insoluble condition).

The combination of the water soluble bisphenol polyol and the branched copolymer containing the copolymerized epoxy ester units enables the cure temperature to be lowered while enhancing the quality of the coating. One factor involved in the lowered curing temperature is the residual unsaturation in the epoxy ester copolymer. Another factor is the chemical identity between the bisphenol polyol ether and the bisphenol-based polyethers which constitute the backbone of the preferred epoxy resins.

The water soluble bisphenol polyols of U.S. Pat. No. 3,960,983 do not contemplate the presence of branched copolymers or chemical correspondence with another resin.

It is particularly preferred to employ a bisphenol-based polyepoxide having a 1,2-epoxy equivalency of from about 1.4 to about 2.0, which is reacted with two different ethylenically unsaturated monocarboxylic acids to substantially consume the epoxy functionality. One of the monocarboxylic acids contains conjugated ethylenic unsaturation, and the other monocarboxylic acid contains nonterminal nonconjugated ethylenic unsaturation. The polyepoxide can be reacted with the acids separately or with a mixture of the acids. The resulting unsaturated epoxy ester thus contains two different types of unsaturated side chains. When this epoxy ester is copolymerized in organic solvent solution with monoethylenically unsaturated monomer containing terminal ethylenic unsaturation, an organic solvent soluble copolymer is formed with the conjugated unsaturation in the epoxy ester while leaving the nonterminal nonconjugated unsaturation unconsumed which helps to lower curing temperature. Also, when a portion of the described monomers provides a primary hydroxyl group, the curing temperature needed for cure with the aminoplast or phenoplast resin is further reduced.

The preferred starting materials are diepoxides or include diepoxides in admixture with monoepoxides. The epoxy esters preferred herein are derivatives of the diepoxide component, and have the following formula:

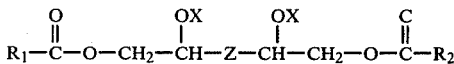

where $R_1$ is the residue of a fatty acid containing conjugated unsaturation, $R_2$ is the residue of a fatty acid containing nonterminal nonconjugated unsaturation, X is hydrogen or $R_1$ or $R_2$ and Z is the residue of an organic diepoxide in which some of the hydroxyl groups may also be esterified. The fatty acid would normally contain from 8–22 carbon atoms, preferably from 10–18 carbon atoms in the molecure. It will be understood that mixtures are formed which include the species shown by formula.

When the epoxy esters described above are copolymerized in water miscible organic solvent solution with monoethylenically unsaturated monomers having terminal unsaturation and which may include hydroxy-functional as well as carboxyl-functional monomers, a copolymer is formed in which much of the nonconjugated unsaturation in the epoxy ester is retained in a copolymer containing carboxyl groups and which may also contain primary hydroxyl groups. The acidic unsaturated resinous copolymers so-obtained are nongelled and organic solvent soluble, and can be dispersed in water with the aid of a base and water miscible organic solvent.

The oxidative cure with atmospheric oxygen is assisted by the presence of driers, and driers, such as cobalt naphthenate, zirconium naphthenate, calcium naphthenate, or similar drier metal fatty acid salt, may be used and are helpful, but these are not needed. The driers would be used in an amount of about 0.3 to about 2%, based on the weight of the copolymer.

The preferred starting materials are resinous polyepoxides. Bisphenol-based diepoxides are particularly preferred. The average molecular weight of these can range from about 350 to about 4000 and the epoxy functionality is preferably in the range of 1.4–2.0, most preferably 1.8–2.0. Higher functional polyepoxides are also useful, but care must be taken to limit the proportion of conjugated unsaturation to avoid gelation during copolymerization. These molecular weights are obtained by calculating from the epoxide equivalent weights.

It is particularly preferred to employ a diglycidyl ether of bisphenol A having an average molecular weight of about 800 to about 3000, and diglycidyl ether of bisphenol A having an epoxide equivalent weight of about 900 and an average molecular weight of about 1800 will be used as illustrative.

To enable copolymerization with the terminal unsaturation in the monoethylenically unsaturated monomer, reliance is had upon a fatty acid including conjugated unsaturation. These fatty acids will be illustrated herein by conjugated $C_{9-11}$ castor fatty acids which are a commercially available mixture of fatty acids which contain conjugated unsaturation at the 9 and 11 positions. Eleostearic acid, found in tung oil, and licanic acid, found in oiticica oil will further illustrate the conjugated fatty acids which are contemplated.

It is desired that the copolymerization leave the epoxy ester in nongelled organic solvent-soluble condition, and this means that the number of conjugated groups per molecule must be limited to avoid cross-linking which causes premature gelation. For this reason, the conjugated fatty acid is used in an amount to provide from about 0.2 (preferably at least 0.5) to about 2.0 moles thereof per epoxy equivalent in the polyepoxide. Preferred proportions are from about 0.8 to about 1.5 mole of conjugated fatty acid per epoxy equivalent in the polyepoxide.

All of the epoxy functionality is consumed by reaction with the fatty acids. One can elect to include a proportion of saturated fatty acid such as lauric or myristic acids. It is preferred, however, to employ at least about 0.5 mole (preferably at least about 0.8 mole) of nonterminal nonconjugated unsaturated fatty acid per epoxy equivalent in the polyepoxide to provide enough residual unsaturation in the final copolymer to enable a reasonable oxidative cure to take place.

Fatty acids containing nonterminal nonconjugated ethylenic unsaturation are well known and will be illustrated herein by tall oil fatty acids. Other useful acids are oleic acid, linoleic acid, linolenic acid, and erucic acid.

Typical proportions are illustrated by the use of a diepoxide reacted with two molar proportions of conjugated fatty acid and two molar proportions of nonterminal nonconjugated unsaturated fatty acid, with not more than 50% molar excess of either type of fatty acid over the other. All of the epoxy groups are esterified and preferably, at least some of the hydroxyl groups are esterified. The acid number of the epoxy ester product should be below 40, preferably below 20 to minimize the proportion of free fatty acid.

The reaction of the polyepoxide with the fatty acid is a conventional reaction which is assisted by the presence of a small amount of a basic catalyst which is normally an amine. The formation of epoxy esters and the production of soluble copolymers therefrom is shown in U.S. Pat. No. 2,877,195.

The monoethylenically unsaturated monomers will constitute from about 15% to about 150%, preferably from 50% to 90%, based on the weight of the epoxy ester. These monomers contain terminal unsaturation as previously indicated, and are desirably constituted by a mixture of carboxyl-functional monomer, optionally monomer having a primary hydroxyl group, and nonreactive monomer. As is common knowledge, a nonreactive monomer does not react under the contemplated conditions of polymerization and cure. This usually means that the single ethylenic group is the only functional group present.

The carboxyl-functional monomers must be selected for solubility and capacity for copolymerization. Suitable acids are acrylic acid, methacrylic acid, fumaric acid and maleic acid. The number of carboxyl groups is not important, but one, as in acrylic acid, is preferred. Enough acid should be used to enable dispersion in water after neutralization, and this requires from about 3% to about 20% of the carboxyl-functional monomers based on the weight of the copolymer. In preferred practice one would use from 5% to 12% of the carboxyl-functional monomers based on the weights of the copolymer.

The hydroxy-functional monomer is illustrated by hydroxy ethyl acrylate or methacrylate or allyl alcohol which provide primary hydroxy groups for cure with the aminoplast resin. From about 1% to about 15%, preferably from 2% to 8% of the weight of the copolymer is desirably constituted by the hydroxyl monomer. It should be noted that the epoxy ester itself possesses hydroxy groups, but these are secondary hydroxy groups which do not provide the low temperature cure desired herein.

The nonreactive monomers are best illustrated by styrene, but vinyl toluene may be used in its place. Less desirably, one can use methyl methacrylate, acrylonitrile, vinyl acetate, ethyl acrylate, butyl acrylate, or the like, alone or in admixture with one another. Styrene or vinyl toluene will preferably constitute the entirety of the nonreactive monomers since this provides a clear homogeneous copolymer which is hard to obtain when other nonreactive monomers are used.

The solution copolymerization is itself entirely conventional, the reaction taking place in the solvent medium using heat and a free radical polymerization catalyst, normally a blend of peroxides, such as ditertiary butyl peroxide and cumene hydroperoxide. The solution polymerization does not consume all of the unsaturation, and it is preferred to have a residual iodine value in the copolymer of at least about 40.

The solvents used should be minimized and selected for miscibility with water in the amounts used. Ether alcohols, such as 2-butoxy ethanol, exhibit good water miscibility, and ketones, such as methyl ethyl ketone, are also quite good. However, solvents with limited miscibility in water are also helpful, such as small amounts of butanol. The class of organic solvents which may be present when acidic resins are dispersed in water with the aid of a base is well known, and is not a feature of this invention, but alcoholic solvents are preferred. The presence of the bisphenol polyol and esters thereof helps to reduce the proportion of solvent which is needed.

The volatile base used to neutralize the copolymer acidity is subject to wide variation, but nitrogenous bases are preferred, these being well known for the purposes of solubilizing acidic resins to provide aqueous coatings. Amines or ammonia are particularly useful, tertiary amines being best. This invention will be illustrated using dimethyl ethanol amine, but selection of the base is not a feature of this invention.

Neutralization of the copolymer acidity may be partial or complete as needed for dispersion in water. Complete (100%) neutralization is preferred herein, but normally 50–100% neutralization is adequate.

The initial solvent solution of neutralized resin is thinned with water until the water predominates. The final resin solids content can range from about 20% up, depending upon the coating thickness which is desired and the viscosity which can be tolerated for application. Flow coating constitutes a preferred application technique in this invention, but the invention is not so limited. Typical coatings are applied at 30–60% resin solids, and these can be pigmented or not as desired. Corrosion-resisting pigments, such as the conventional chromate pigments like strontium chromate and lead chromate may be used. For electrocoating, a resin solids content in the range of 2–20%, preferably 5–15%, is employed.

When the coatings are dried and cured in air at room temperature, the oxidative cure with atmospheric oxygen gradually eliminates the solvent sensitivity of the film, and is complete in about 3 days. Regardless of whether cure is at room temperature or higher, driers, such as cobalt naphthenate, zirconium naphthenate, or calcium naphthenate, may be used in an amount of about 0.3 to about 2%, based on the weight of the copolymer.

The aminoplate and phenoplast resins which are useful herein may be of any character so long as they can be dissolved or stably dispersed in water containing the dissolved acidic copolymer. These resins provide methylol groups which are particularly reactive with the primary hydroxy groups and are used in an amount of from 5%-50%, preferably from 25%-45%, based on the total weight of resin. Typical aminoplast resins, all of which are formaldehye condensates, are urea-formaldehyde, hexamethoxy methyl melamine and water dispersible transethers thereof with ethanol or other lower alcohol, benzoguanamine-formaldehyde and the like, including acidic derivatives where the carboxyl groups assist solubilization in aqueous alkaline medium. Water soluble or dispersible phenolic resins (phenoplasts) are also useful, these being illustrated by the well known nongelled alkaline condensates of phenol with excess formaldehyde known as "A" stage resols. Any of these formaldehyde condensates can be used alone or in any desired mixture thereof. The phenolic resins provide the most outstanding corrosion and detergent resistance, but they introduce color problems which limit utility to primers which will be overcoated with opaque toppers. The phenolic resins also require higher baking temperature than the aminoplast resins, but this invention still serves to reduce the temperature which is needed.

The water soluble bisphenol polyols are simple adducts of a bisphenol with ethylene oxide. The usual bisphenol compound is bisphenol A in which the hydroxy groups are in the para position to the divalent moiety which joins the two phenolic groups. The ethylene oxide adduction is carried out to an extent to provide water solubility. All this is known and set forth in U.S. Pat. No. 3,960,983 referred to earlier. These polyols are useful herein in a proportion of from 2-25% of total resin solids, preferably from 5-20% on the same basis.

The invention is illustrated in the following example. All parts herein are by weight unless otherwise stated.

BEST MODE FOR CARRYING OUT THE INVENTION

EXAMPLE 1

Charge Composition (grams)

627 Diglycidyl ether of bisphenol A having an epoxide equivalent weight of 900 (0.7 equivalents) (note 1)
Note 1—Shell Epon 1004 may be used.
Conjugated 9-11 castor fatty acids (0.85 equivalents)
238 Tall oil fatty acids (0.85 equivalents)
Set Dean-Stark trap with xylol. Heat to melt (about 110° C.). Then add the following:
47 Xylol
3 Triethyl amine
Heat to 225° C. and hold for an acid value of 15-17. Cool and adding the following:
1105 2-butoxy ethanol
268 Water soluble ethoxylated bisphenol A containing 6 mols of adducted ethylene oxide per mol of bisphenol A (note 2)
Note 2—Dow XD 8025.01 may be used.
Premix the following monomers and catalysts and add over 3 hours at 125° C.
688 Styrene
130 Acrylic acid
46 Hydroxyethyl acrylate
11 Ditertiary butyl peroxide
35 Cumene-hydro-peroxide
20 t-dodecyl mercaptan
Hold for 1 hour and finish as follows:
8 Cumene-hydro-peroxide—add and hold for 1 hour.
8 Cumene-hydro-peroxide—add and hold for 2 hours.
Add the following solvents, and cool.
192 2-butoxy ethanol The product is an organic solvent solution having a Gardner-Holdt viscosity of Z-$Z_1$, a Gardner color of 3-4, an acid value of 45.8, and a nonvolatile solids content of 60.2%. Upon addition of sufficient dimethyl ethanol amine to neutralize 100% of the acidity, the product is soluble in water.

The coating solution of Example 1 cures upon baking at a temperature of 220° F., while without the adducted bisphenol-based polyol, the cure temperature would typically be at 260° F. which is significantly higher than that needed in this invention. However, and despite the lower curing temperature, excellent detergent resistance is obtained.

In comparison with the corresponding solution which does not include the polyol, the viscosity is significantly lower while the solids content is significantly higher.

The improvement which is obtained is illustrated by a comparison with a control identified as Example 2 which is the same as Example 1, except the ethoxylated bisphenol A is omitted. The Examples 1 and 2 polymer solutions which were compared had the following characteristics:

|  | Example 1 (repeat) | Example 2 (repeat) |
|---|---|---|
| Non-Volatile Solids | 63% | 57% |
| Viscosity (Gardner-Holdt) | Z-$Z_1$ | $Z_3$-$Z_4$ |
| Color (Gardner) | 3-4 | 3-4 |
| Acid Value | 45.8 | 51.6 |

The solutions of Examples 1 and 2 were formulated into aqueous coatings by grinding 200 parts of the polymer solution with 10 parts of dimethyl ethanol amine and 215 parts of titanium dioxide (DuPont R-902). The grind was continued to provide a North-Shore grind guage reading of 6-6½. This pigment grind in an amount of 454 parts was mixed with 127 parts of additional polymer solution, 128 parts of hexamethoxy methyl melamine, 2×8 parts of dimethyl ethanol amine and 328 parts of deionized water. The result is an aqueous coating solution ready for test.

These aqueous solutions made with the polymers of Examples 1 and 2 were coated upon zinc phosphate-treated steel panels and baked 20 minutes at 220° F. to provide smooth and glossy coatings 0.8 mil thick. Flow was excellent and the cured coatings were each 3H in pencil hardness. However, the gloss was higher in Example 1 and the Example 1 coated panel passed 48 hours of detergent testing while Example 2 blistered in the same 48 hour detergent test. Also, Example 2 showed poor edge wetting while Example 1 applied excellently.

The presence of residual unsaturation in Example 1, enabling an air dry cure, is established by the fact that on air drying the dry film is initially slightly tacky (it accepts a fingerprint) and it is soft and easily removed with a soft pencil (about 2B). After 1 day's exposure to air, the surface does not accept a fingerprint and it is hard (about HB pencil hardness). It is difficult to measure the residual unsaturation because unpolymerized monomer can foul the measurement, so the precise extent of residual unsaturation is not a primary feature of this invention.

We claim:

1. An aqueous coating composition containing a branched copolymer of an ethylenically unsaturated epoxy ester with monoethylenic monomers including about 3% to about 20% of carboxyl-functional monomer selected from the group consisting of acrylic acid, methacrylic acid, fumaric acid, and maleic acid based on the weight of the copolymer, the copolymer being dispersed in the aqueous composition with the aid of a volatile base, an aminoplast or phenoplast resin curing agent, and a water soluble polyol formed by ethoxylation of a bisphenol.

2. An aqueous coating composition as recited in claim 1 in which said copolymer includes residual unsaturation providing an iodine number of at least about 40.

3. An aqueous coating composition as recited in any of claims 1 or 2 in which said carboxyl-functional monomers are present in an amount of from 5% to 12% of the weight of the copolymer.

4. An aqueous coating composition as recited in any of claims 1 or 2 in which said epoxy ester is constituted by a resinous polyepoxide having an epoxy functionality in the range of from 1.4 to about 2.0 esterified with at least about 0.2 moles of ethylenically unsaturated monocarboxylic fatty acid containing conjugated ethylenic unsaturation per epoxy equivalent in the polyepoxide, and at least about 0.5 mole of ethylenically unsaturated monocarboxylic fatty acid containing non-terminal nonconjugated ethylenic unsaturation per epoxy equivalent in the polyepoxide, said monocarboxylic fatty acids containing from 8–22 carbon atoms and being present in stoichiometric excess with respect to epoxy functionality, and to react with at least some of the hydroxy groups which are present.

5. An aqueous coating composition as recited in any of claims 1 or 2 in which said polyol is present in an amount from 2–25% of total resin solids.

6. An aqueous coating composition as recited in claim 5 in which hexamethoxy methyl melamine is the curing agent and is used in an amount of from 5% to 50%, based on the total weight of resin.

* * * * *

UNITED STATES PATENT OFFICE
CERTIFICATE OF CORRECTION

Patent No. 4,222,912     Dated Sep. 16, 1980

Inventor(s) Kazys Sekmakas and Raj Shah

It is certified that error appears in the above-identified patent and that said Letters Patent are hereby corrected as shown below:

Col. 5, line 10, "aminoplate" should read --aminoplast--

Col. 5, line 34, "toppers" should read --topcoats--

Col. 5, line 60, "Conjugated" should read --238 Conjugated--

Signed and Sealed this

Twenty-third Day of December 1980

[SEAL]

*Attest:*

SIDNEY A. DIAMOND

*Attesting Officer*     *Commissioner of Patents and Trademarks*